(12) United States Patent
Kloos

(10) Patent No.: US 8,851,725 B2
(45) Date of Patent: Oct. 7, 2014

(54) LIGHTING DEVICE FOR VEHICLES

(71) Applicant: Hella KGaA, Lippstadt (DE)

(72) Inventor: Gerhard Kloos, Erwitte (DE)

(73) Assignee: Hella KGaA, Lippstadt (DE)

( * ) Notice: Subject to any disclaimer, the term of this patent is extended or adjusted under 35 U.S.C. 154(b) by 190 days.

(21) Appl. No.: 13/646,375

(22) Filed: Oct. 5, 2012

(65) Prior Publication Data

US 2013/0128602 A1    May 23, 2013

(30) Foreign Application Priority Data

Oct. 6, 2011    (DE) .................. 10 2011 054 235

(51) Int. Cl.
  *B60Q 1/00*    (2006.01)
  *F21V 7/00*    (2006.01)
  *F21S 8/10*    (2006.01)

(52) U.S. Cl.
  CPC ............... *B60Q 1/00* (2013.01); *F21S 48/1154* (2013.01); *F21V 7/00* (2013.01); *F21S 48/1275* (2013.01); *F21S 48/1208* (2013.01)
  USPC ........................................... 362/516; 362/544

(58) Field of Classification Search
  CPC .................................. F21V 7/00; B60Q 1/00
  USPC .......................................... 362/516, 543, 544
  See application file for complete search history.

(56) References Cited

U.S. PATENT DOCUMENTS

2013/0279161 A1*  10/2013  Pickard et al. ............... 362/231

* cited by examiner

*Primary Examiner* — David V Bruce
(74) *Attorney, Agent, or Firm* — Husch Blackwell LLP

(57) ABSTRACT

A lighting device for vehicles with a number of light sources and with an optic unit to generate a predetermined light distribution, with the optic unit comprising at least one optic area, held via holding means in a predetermined assembly position, with a transparent substrate being provided with a plurality of grooves as fastening means so that an edge of the optic area can be framed in the groove.

10 Claims, 3 Drawing Sheets

LIGHTING DEVICE FOR VEHICLES

CROSS REFERENCE

This application claims priority to German Patent Application No. 10 2011 054 235.3, filed Oct. 6, 2011.

TECHNICAL FIELD OF THE INVENTION

The invention relates to a lighting device for vehicles with a plurality of light sources and an optic unit to generate a predetermined light distribution, with the optic unit comprising at least one optic area held via holding means in a predetermined assembly position.

BACKGROUND OF THE INVENTION

A lighting device for vehicles is known from DE 10 2008 005 488 A1 comprising a number of light sources arranged like a matrix. An optic unit is arranged in front of the light sources comprising a light forming optic unit. A pre-optic unit is arranged between the light forming optic unit and the light sources comprising a plate provided with fine-structured elements. These fine-structured elements allow a spreading of the light emitted by the light sources so that a homogenization of the distribution of light intensity is possible. It has been shown, though, that it is desirable for optic areas to extend perpendicular to the level of light generation in order to adjust light emitted by light sources arranged at a certain distance from each other to the light forming optic unit.

SUMMARY OF THE INVENTION

The objective of the present invention is therefore to further develop a lighting device for vehicles with light sources arranged like a matrix in reference to each other such that a robust and simply assembled arrangement is possible of optic areas extending in the primary direction of emission, particularly to homogenize the light distribution.

In order to attain this objective in connection with the preamble of claim 1 the invention is characterized such that a transparent substrate with a number of grooves is provided as holding means so that an edge of the optic area can be inserted into the groove.

The invention allows a robust and technically easily handled holding arrangement of particularly planar optic surfaces provided to reflect light emitted by light sources. The optic areas rest and are fastened in a groove of a transparent substrate. The optic surface is arranged perpendicular in reference to the transparent substrate. The transparent substrate may be easily fastened with its flat side, free from grooves, at the arrangement of light sources. Due to the fact that the edges of the optic surface immerse in the groove of the transparent substrate the edges of the optic area are arranged in a protected fashion. The transparent substrate as well as at least one optic surface preferably form a pre-optic unit for the light formation.

According to a preferred embodiment of the invention the grooves of the transparent substrate extend intersecting, so that respectively cross-wise arranged optic surfaces, for example for homogenization of the light from light sources arranged like a matrix, can be easily assembled in one step and safely held in the assembled position.

According to a preferred embodiment of the invention the groove of the transparent substrate shows such a groove width that the optic surface is held in the groove in a clamped fashion. This way a simple and cost-effective assembly is possible.

According to a further development of the invention the optic area shows two opposite reflective flat sides so that a band grid with recesses is formed integrated in the transparent substrate with light sources each being allocated thereto. Advantageously here a homogenization of the light and/or an increase of the light efficiency can be provided here.

According to a further development of the invention the transparent substrate comprises a glass material, preferably provided by masking and etching with the grooves for accepting the optic area.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION

Figure 1:
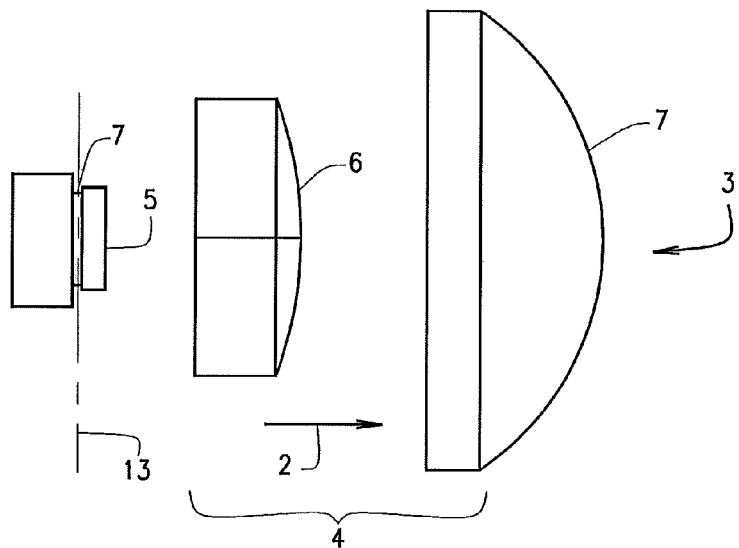
FIG. 1 A schematic side view of a lighting device.

In the following detailed description numerous specific details are set forth in order to provide a thorough understanding of the invention. However, it will be understood by those skilled in the art that the present invention may be practiced without these specific details. For example, the invention is not limited in scope to the particular type of industry application depicted in the figures. In other instances, well-known methods, procedures, and components have not been described in detail so as not to obscure the present invention.

The lighting device according to the invention for vehicles is preferably used in headlights to generate a controlled distribution of high beams, in which to avoid undesired blinding of vehicular objects in the area in front of the headlights preferably by switching off respective light sources some lit areas of the light distributed can be switched off.

The lighting device essentially comprises a number of matrix-like arranged light sources (light source matrix) 1 and an optic unit 3 arranged in the primary direction of light emission 2 in front of the light source matrix 1, comprising a light forming optic unit 4 and a pre-optic unit 5. The light forming optic unit 4 comprises a first lens 6 and a second lens 7, arranged off-set in reference to each other in the primary direction of emission 2.

The pre-optic unit 5 is arranged between the light forming optic unit 4 and the light source matrix 1 directly following the light source matrix 1. The pre-optic unit 5 essentially comprises a transparent substrate 8 connected to a plurality of planar band elements 9.

Figure 2:
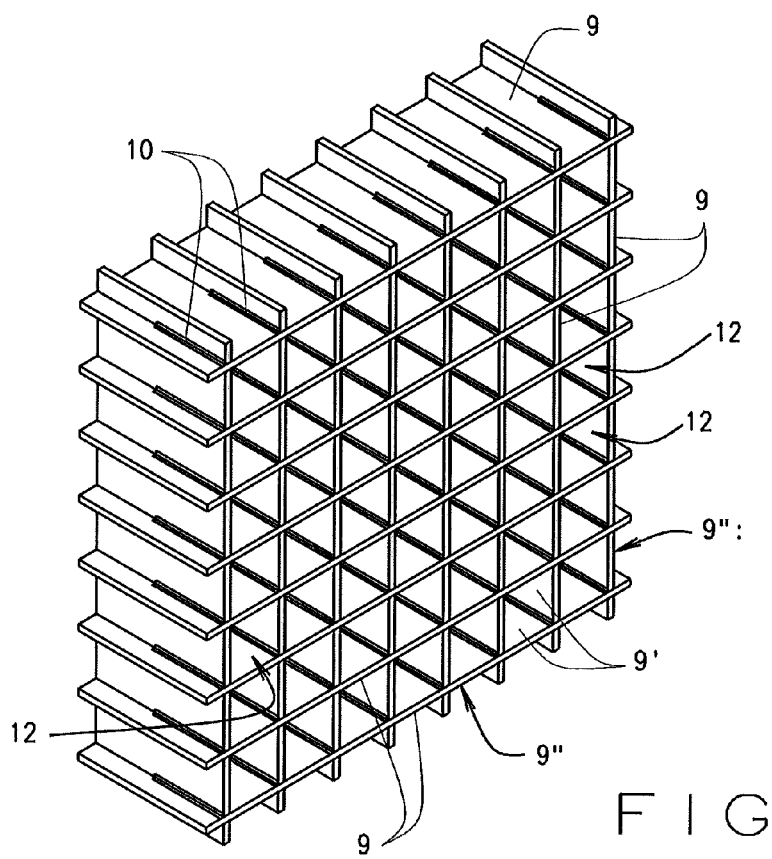
FIG. 2 a perspective illustration of cross-wise arranged optic surfaces before they are connected to the transparent substrate, FIG. 3 a perspective illustration of a transparent substrate with cross-wise grooves formed thereat, FIG. 4a a perspective illustration of a transparent substrate with a transparent lid being allocated thereto, and FIG. 4b an illustration of the substrates according to FIG. 4a with the boundary lines of the grooves being depicted.

The planar band elements 9 each comprise opposite highly reflective flat sides 9', 9" and are arranged like a grid in lines and columns extending perpendicular in reference thereto. The planar band elements 9 are each embodied comb-like and show lateral slots 10 by which a first band element 9 each can be connected and/or plugged to another band element 9 extending perpendicular in reference thereto. The band grid composed from the band elements 9 is shown in FIG. 2.

Figure 3:
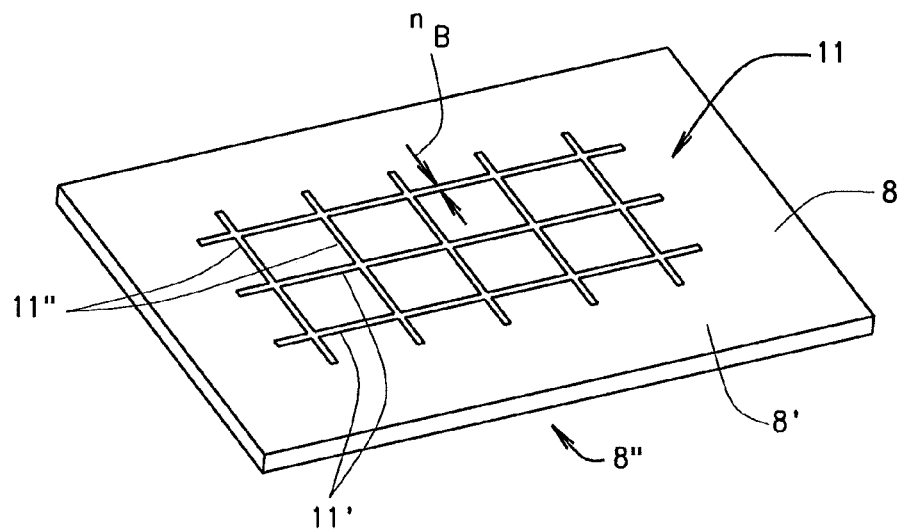

The transparent substrate 8 is embodied plate-shaped and comprises a glass material. Grooves 11 are formed on a first flat side 8' extending cross-wise, which correspond in their dimension to edges of the band grid formed by the band elements 9. In the embodiment according to FIG. 3 three horizontal grooves 11', and five vertical grooves 11" are provided, so that a respective band grid with 3×5 band elements 9 can be inserted into the grooves 11. The band elements 9 are inserted such that a long edge thereof immerses in the groove 11.

The grooves 11 show a groove depth $t_N$ smaller than a thickness $d_S$ of the transparent substrate 8 so that the grid-shaped arranged band elements 9 cannot be passed through to reach a flat side 8" of the substrate 8 free from grooves.

The grooves 11 show a groove width $n_B$ so that the band elements 9 are held in the groove 11 in a clamped fashion. Alternatively the groove width $n_B$ can also be selected of such a size that the band elements 9 can engage the groove with play and are then held in the assembled position via an adhesive.

In the assembled state of the band elements 9 they limit with their flat sides 9', 9" a recess 12, with its axis being parallel in reference to the primary direction of emission 2 and/or perpendicular to the light generation level 13 stretched by the light sources 1. The flat sides 9', 9" of the band elements 9 therefore form highly reflective optic surfaces extending parallel in reference to the optic axis of the light sources 1. They allow a multiple reflection of the light emitted by the light sources before the light reaches the light forming optic unit 4. Preferably the pre-optic unit 5 formed from the transparent substrate 8 and the band elements 9 is arranged directly adjacent to the light source matrix 1. Preferably the flat side 8" free from grooves is arranged at a side facing the light source matrix 1, while the flat side 8' comprising grooves is arranged on a side facing the light forming optic unit 4.

The grid-shaped groove structures of the transparent substrate 8 may be produced by way of lithography using masking and etching. The transparent substrate 8 preferably comprises a glass material.

Figure 4A:
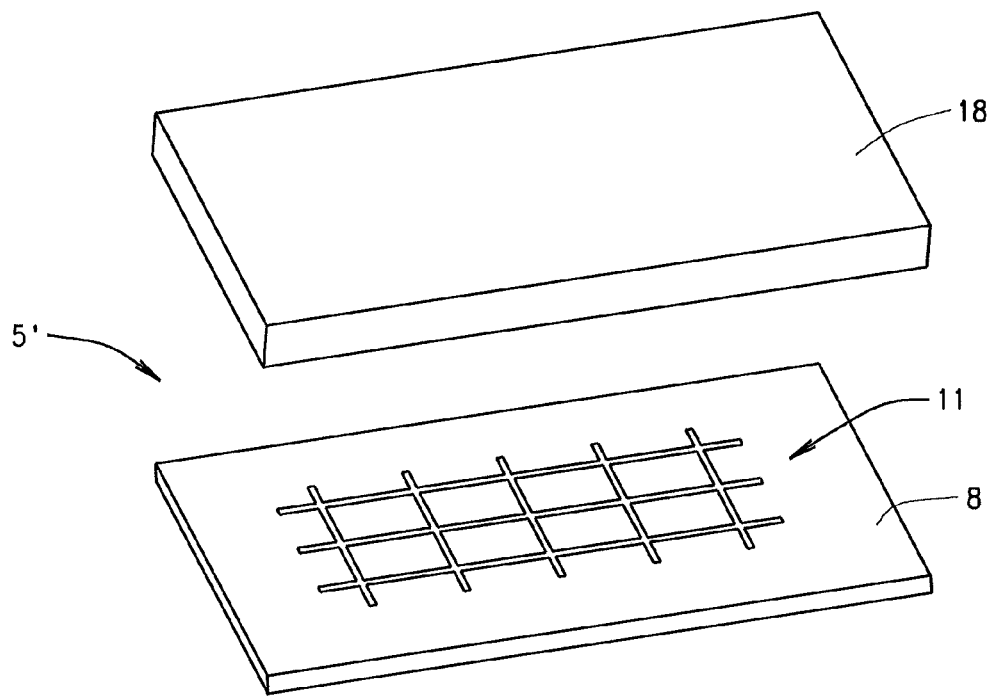
Figure 4B:
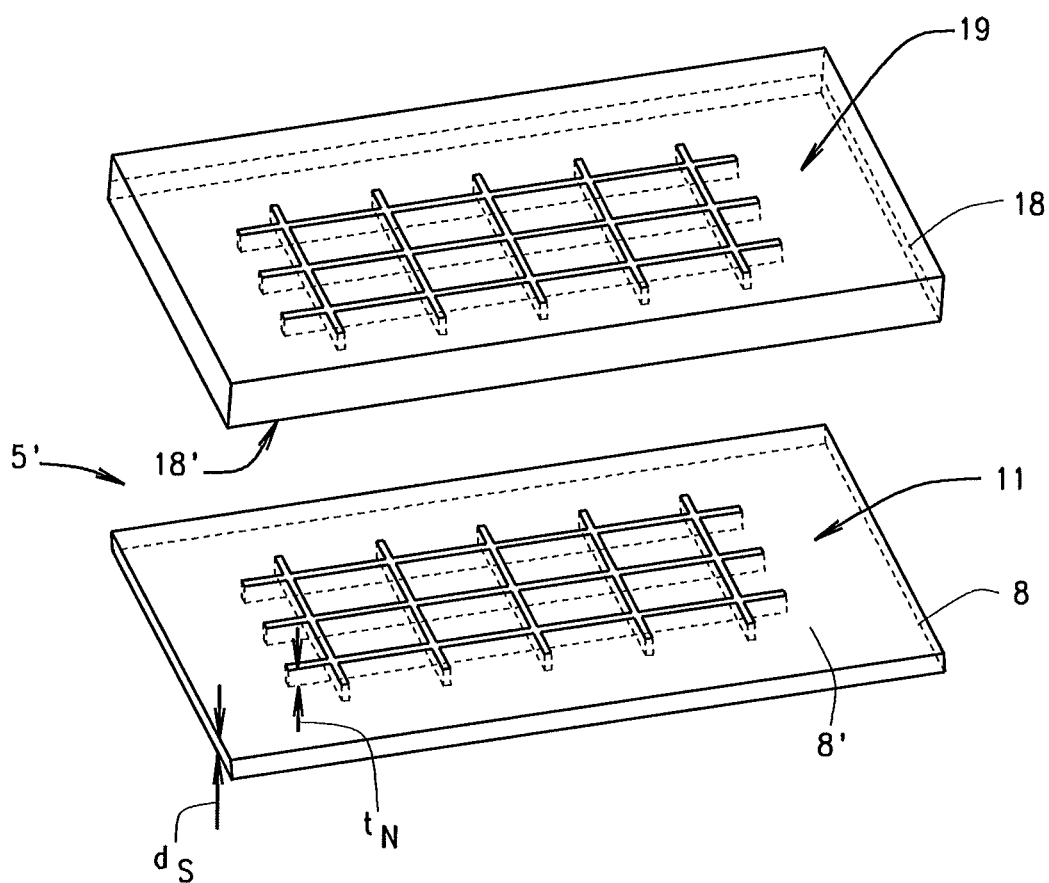

In an alternative embodiment of the invention according to FIGS. 4a and 4b the pre-optic unit 5 can also be formed by a combination of the transparent substrate 8 and a transparent lid 18. The transparent lid 18 also shows a cross-wise structure with grooves 19 matching the grooves 11 of the substrate 8 so that an elevated portion of the band elements 9, inserted in the first transparent substrate 8, can be accepted. In the assembled state the flat sides 8' of the first substrate 8 provided with grooves 11 directly and planarly contact the flat side 18' of the transparent lid 18 provided with grooves 19. Thus a compact and robust pre-optic unit 5' develops, with the band grid 9 being arranged protected therein.

According to an alternative embodiment not shown the band elements 9 can also be inserted entirely in the grooves 11 and covered with a lid free from grooves.

For the assembly individual band elements 9 are connected to each other and/or plugged together cross-wise by engaging respective lateral slots 10. Subsequently the band grid formed this way is inserted in a single processing step into the grooves 11 of the transparent substrate 8. If applicable, then the transparent lid 18 also provided with grooves 19 can be placed onto the transparent substrate 8 with an aligned arrangement of the grooves 19 to the band grid 9 and, for example, connected thereto by way of adhesion.

The light sources are embodied as LED light sources and/or as LED chips, to be stretched together in the light generation level 13. The light generation level 13 is arranged perpendicular in reference to the optic axis of the optic unit 3.

The preferred embodiments of the invention have been described above to explain the principles of the invention and its practical application to thereby enable others skilled in the art to utilize the invention in the best mode known to the inventors. However, as various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by the above-described exemplary embodiment, but should be defined only in accordance with the following claims appended hereto and their equivalents.

LIST OF REFERENCE CHARACTERS

1 Light sources (light source matrix)
2 Primary direction of emission
3 Optical Unit
4 Light forming optic unit
5, 5' Pre-optic unit
6 First lens
7 Second lens
8, 8', 8" Transparent substrate, first flat side, flat side free from grooves
9, 9', 9" Band element/flat sides
10 Lateral slots
11, 11', 11" Groove
12 Recess
13 Light generation level
18, 18', 18" Transparent lid
19 Groove

The invention claimed is:

1. A lighting device for vehicles with a number of light sources and with an optic unit to generate a predetermined light distribution, with the optic unit comprising at least one optic area, held via holding means in a predetermined assembly position, wherein a transparent substrate is provided as fastening means with a plurality of grooves so that an edge section of the optic area can be inserted in one of the grooves.

2. The lighting device according to claim 1, wherein the grooves are arranged cross-wise.

3. The lighting device according to claim 1, wherein the grooves of the transparent substrate comprises at least such a groove width that the optic area is held in the groove in a clamped fashion.

4. The lighting device according to claim 1, wherein the grooves show a groove depth smaller than a thickness of the transparent substrate.

5. The lighting device according to claim 1, wherein the transparent substrate comprises a planar plate, arranged parallel in reference to a light generation level formed by light sources arranged like a matrix with a flat side of the transparent substrate free from grooves arranged at a side facing the light sources.

6. The lighting device according to claim 1, wherein the optic area is formed by reflective flat sides of a planar band element.

7. The lighting device according to claim 6, wherein the transparent substrate and the planar band elements form a pre-optic unit, with a light forming optic unit being arranged in front thereof in the primary direction of emission.

8. The lighting device according to claim 6, wherein the planar band elements limit a number of recesses with one light source each being allocated thereto in the axial extension.

9. The lighting device according to claim 1, wherein the grooves are produced by masking and etching a flat side of the transparent substrate.

10. The lighting device according to claim 1, wherein the transparent substrate is made from a glass material.

* * * * *